United States Patent [19]
Ko

[11] 3,837,383
[45] Sept. 24, 1974

[54] DUST COLLECTOR AND SAFETY GUARD

[76] Inventor: Kenneth Ko, 1976 N. Kenmore Ave., Los Angeles, Calif. 90027

[22] Filed: Nov. 9, 1972

[21] Appl. No.: 305,324

[52] U.S. Cl.............. 144/251 A, 90/11 R, 51/273, 29/DIG. 58, 29/DIG. 86, 408/67, 408/241 G, 144/252 R
[51] Int. Cl....................... B27g 21/00, B23q 11/06
[58] Field of Search.................. 408/56, 67, 241 G; 144/251 A, 252 R; 90/11 R; 51/273; 29/DIG. 58, DIG. 56, DIG. 84, DIG. 86

[56] References Cited
UNITED STATES PATENTS

| | | | |
|---|---|---|---|
| 1,938,330 | 12/1933 | Hall | 51/273 |
| 3,322,169 | 10/1967 | Hilliard | 144/252 R |
| 3,594,958 | 7/1971 | Cusumano | 51/273 |
| 3,673,744 | 7/1972 | Oimoen | 51/273 |

OTHER PUBLICATIONS
American Machinist, article entitled "Safety Devices" upper right hand figure, page 134, dated May 10, 1945.

Primary Examiner—Francis S. Husar
Attorney, Agent, or Firm—Smyth, Roston & Pavitt

[57] ABSTRACT

Apparatus for creating a vacuum about a tool for the removal of dust, work chips, etc., generated by contact between the tool and the workpiece. A tubular or cylindrical collecting device is mounted for horizontal and vertical adjustment relative to the tool mounting apparatus and is provided with a tangentially arranged suction apparatus for creating a partial vacuum within the device. In order to allow the operator to follow the contact of the tool with the workpiece visually, in the preferred embodiment the apparatus is manufactured of a transparent material. The device is also a guard to prevent fingers or hands coming in contact with the rotating bit during operation.

13 Claims, 2 Drawing Figures

PATENTED SEP 24 1974

3,837,383

DUST COLLECTOR AND SAFETY GUARD

BACKGROUND OF THE INVENTION

Machine tools in use today, such as routers, milling machines, drill presses, etc., generate a great deal of dust and a large quantity of work chips and other material when they cut into the workpiece. Wide broadcasting of these materials can, for some workpieces, be detrimental to the health of the operator of the machine as well as other workers in the immediate vicinity.

Such waste products can also be dangerous since they tend to build up on the floor around the machine station, often causing the surface of the floor to become slippery and uncomfortable. Also, in the case of wood or other combustible workpieces, for example, a fire hazard may be created by waste such as sawdust.

Further, the waste products of the workpiece can also be detrimental from an economic standpoint; they often make it very difficult for the machine tool operator to view the workpiece since they obstruct the cutting lines, etc. The waste product can also get into the machinery itself and damage bearings, couplings, etc.

In the past, such machine tool operations have required either constant or frequent clean-up operations. In some cases, machinery has been provided which will positively remove the waste products from the immediate vicinity of the cutting or working tool. In most instances, compressed air is directed across the surface of the work table to blow the waste product toward a waste receptacle area from which it can be removed more conveniently.

Some powered hand tools such as routers, etc., have been provided with vacuuming devices which, in most instances, are directly connected to the tool in such a way that a large portion of the waste products of the workpiece are transferred to the vacuum system and thus removed. However, these prior art devices are deficient in a number of ways; they may, for example, obstruct the operator's view and make it difficult for him to operate the tool along the marked cutting lines, etc. Also, in all such known prior art devices, the vacuum has been applied along a plane which is substantially parallel to and intersects the plane of the tool bit. This causes the vacuum force to work in a more random fashion than is desirable, resulting in at least some part of the waste either entering into a continuous movement about the tool without withdrawal from the area thereof, expulsion from around the tool and the vacuum device without delivery to the vacuum system, or turbulent motion around the tool for a longer period of time than is desirable with a resultant poor visibility of the relationship between the tool and the workpiece. Prior art devices also use the vacuum system inefficiently since no attempt has been made to utilize the projectile or centrifugal force of the waste to augment the vacuum force and capture the waste.

This, it has proven to be desirable to form a dust collection device which may be utilized with any type of power tool but preferably with a fixed power tool to which the work is carried for movement relative thereto. Such a device should not obstruct the operator's vision so as to inhibit movement of the tool relative to the workpiece and the configuration should be such as to remove the waste from the workpiece almost instantaneously. It is also desirable that such a device be as efficient as possible in order to control the removal of all the waste.

SUMMARY OF THE INVENTION

The present invention relates to a dust removal apparatus which may be utilized with a router, jigsaw, saber saw, drill press, milling machine, etc. In the preferred embodiment, the device may be utilized with a tool which is normally mounted on a pedestal at a fixed work station to which a workpiece is brought to perform a suitable operation thereon.

More specifically, the invention relates to a dust collection apparatus basically comprising a tubular structure which is located so as to surround the working tool. A suction is taken from the interior of the structure along a tangent relative thereto which allows the workpiece waste to travel through its normal helical arc as it is cut away from the workpiece by the tool and drawn towards the vacuum system. Since the suction force is applied along a tangent of the collector, it is offset relative to the tool bit axis, preferably on a side thereof such that the waste product projectile or centrifugal force implements the vacuum force in capturing the waste. This provision causes the waste product, which shall hereinafter be referred to as dust, to be substantially completely withdrawn from the collection apparatus almost instantaneously, as far as the eye can tell, upon removal from the workpiece.

In its preferred embodiment, the dust collection apparatus is formed as a tubular member which is open at its upper and lower ends so that air may pass therein in both directions and then be drawn into the suction or vacuum system. As a result of being open at the top and the bottom of the tubular structure, a smaller amount of work is required on the part of the vacuum pump and lesser turbulence, which would interfere with the helical flow, is generated within the collecting device.

In order to enhance the operator's vision of the workpiece and the location of the tool relative thereto, the collection device is preferably manufactured from a rigid transparent material, such as plastic, which permits the operator to clearly see the guideline markings on the workpiece as he operates the tool across its surface.

The collecting device may be mounted on the ram or upper arm assembly upon which the tool is supported for its movement relative to the workpiece. Preferably, the collector is mounted for adjustable movement both vertically and horizontally relative to the tool so that it can be fixed in any predetermined position relative thereto and retain that predetermined position regardless of the relative movement between the tool and the workpiece. If desired, a flexible material such as bristle or canvas may be attached to the lower end of the connector in order to provide direct contact between the connector and the workpiece, particularly when the workpiece has an uneven surface or varying thickness. With this structure, the turbulence within the collection apparatus can be even more accurately controlled so that the dust can be drawn into the vacuum system at a rapid rate which does not interfere with the operator's vision.

Various other objects, advantages, embodiments, and modes of the present invention will become apparent to those skilled in the art upon review of the following detailed description, taken together with the accompanying drawing. Of course, the true scope of the invention should be considered to include all such embodiments and modes as shall be covered by the scope of the appended claims.

DETAILED DESCRIPTION

Figures 1, 2:
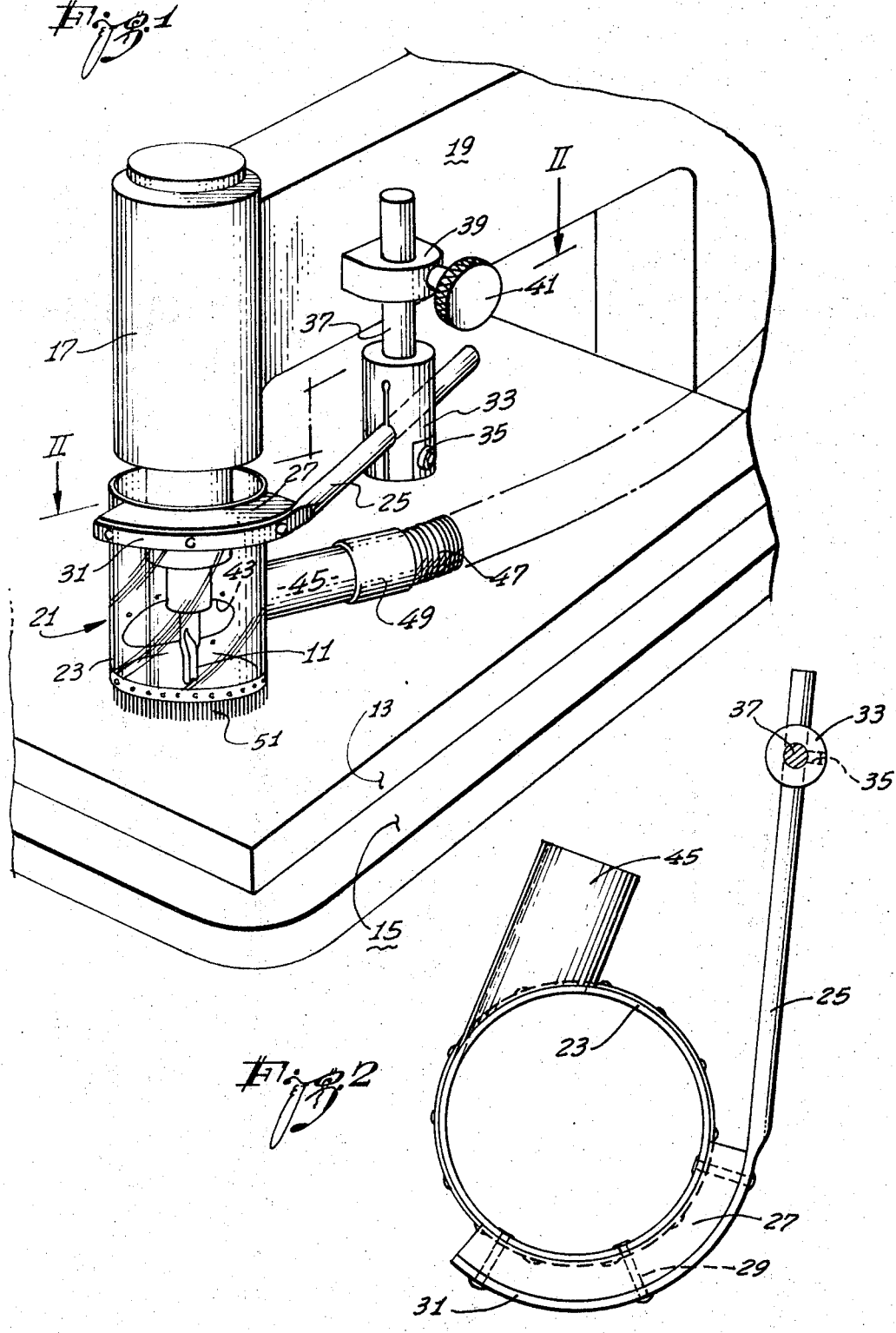
FIG. 1 comprises an isometric illustration of a machine tool utilizing the present invention.
FIG. 2 comprises a top plan view of that portion of FIG. 1 comprising the present invention, as seen along a line II—II.

A preferred embodiment of the present invention is illustrated in FIGS. 1 and 2 being utilized to control and collect the waste generated by the contact of a router tool 11 and a workpiece 13, the latter mounted on a movable table 15. Also, the device positively prevents the machine operator from touching the tool bit, thus enhancing his safety. The particular tool and the arrangement of the workpiece and its table should be considered to be merely exemplary since the invention could be utilized with any type of rotating or reciprocating tool, such as a drill, saber saw, continuous band saw, etc. In the illustrated embodiment, however, the router bit 11 is mounted in an arbor section 17 located on the outer end of an upper arm 19 of a suitable tool base and driven by a motor (not shown) on the base.

The illustrated embodiment of the invention comprises a dust collector or housing 21 including a cylindrical or tubular collector body 23. Preferably, the collector is formed from transparent material, such as Plexiglass, so that the member does not obstruct the operator's vision and thus does not inhibit his control of the relative movement of the workpiece and the tool bit.

As illustrated, the collector body 23 is manufactured as a single element. However, it will be realized by those skilled in the art that if the device is, for example, to be used with a band saw, it may be manufactured in two or more longitudinal sections which may be suitably fastened together by any desired means such as the engagement of interface flanges, encircling bands, etc.

The collector body 23 may be supported in vertical adjustment by means of a support arm 25 which may either be directly attached to the collector body or attached thereto through a spacing element 27. In either case, suitable fastening means such as bolts 29 may be threaded through the end of the arm, which, if desired, may be flattened as illustrated at 31. If the spacer 27 is utilized, the attachment of the arm to the collector body is facilitated since the peripheral configuration of the spacer, which may, for example, be wood, is more easily altered than is the configuration of either the arm or the collector body. Also, the spacer allows the compressive forces exerted by the bolts 29 to be distributed over a wider area and thus helps to prevent any cracking or breaking of the collector body.

Arm 25 may be supported for horizontal movement in an adjustable clamp 33 actuated by any suitable means such as bolt 35. Thus, when the bolt is turned out of the clamp, the rod 25 may be adjusted relative thereto so that the collector bdoy 23 can be adjusted to a position in which the tool bit is substantially at the axis thereof. When this is accomplished, the bolt 35 can then be tightened and linear movement of the collector body in the horizontal plane will be prohibited.

In order to provide adjustment for the collector body along a vertical aixs, the clamp 33 may be fixed to a shaft 37 which extends through a bore in a flange 39. A setscrew member 41 may be threaded into the flange 39 on an angle which is substantially perpendicular to the shaft 37 so that the pòsition of the shaft may be fixed therein. It will be realized that the setscrew 41, when tightened against the shaft, will not only prohibit movement of the collector body in a vertical plane but will also prohibit its movement in an arc about the axis of the shaft 37. Of course, the illustrated position-locating devices are meant only to be exemplary and any desired devices may be used instead.

In order to collect the dust gathered by the body 23, an opening 43 may be formed therein to which a pipe element 45 may be suitably attached. The tubular or pipe element 45 may also be suitably connected to a hose 47 which, if desired, may be flexible, by means of a suitable coupling 49.

Examination and comparison of FIGS. 1 and 2 in the drawing will quickly reveal that the opening 43 and tubular element 45 are so related and positioned relative to the collector body as to be substantially tangential or, in other words, offset from the axis of the collector body. Looking downward from above the tool, it shall be assumed that the tool bit normally rotates in a clockwise direction. It will be realized from looking at FIG. 2 that the opening 43 and tubular member 45 are offset from the axis of the body 23 such that dust or work particles spinning in the collector body in a clockwise direction will tend to be expelled or projected into the tubular element through the opening. Since suction may be applied to the tubular element 45 via the hose 47, this specific structural relationship causes dust generated by the tool bit to be expelled from the body into the opening 45 both under the influence of centrifugal force generated by the tool bit and by the vacuum force taken through the hose. Of course, this feature significantly increases the efficiency of the device.

Referring now to FIG. 1, it will be seen that the upper end of the collector body may be separated, if desired, from the arbor section 17 of the machine tool itself. This separation allows a constant stream of air to be drawn into the collector body across the upper end thereof and thus prevents any dust generated by operations on the workpiece from leaving the collector body through that area. This will help to protect the operator's eyes. Further, the lower end of the collector body may be spaced from the surface of the workpiece by a predetermined amount such that a relatively rapid rate of airflow occurs in that area under the influence of the vacuum suction. Consequently, it will be realized that no dust can be expelled from the collector body at the lower end thereof.

In certain cases, such as when operating on workpieces having non-uniform surfaces, it may be desirable to provide a flexible element 51 on the lower end of the collector body 23. Since the flexible element 51, for example, brush-like bristles, canvas, etc., which will restrict the flow of air past the lower end of the collector body, the air flowing through that vicinity will travel at a slightly higher velocity. As a result, any dust on the surface will be carried forcefully away from the workpiece surface and the tool and into the tubular element 45 so as to be captured by the vacuum.

It will be realized by those skilled in the art that a wide variety of additional embodiments of the present invention become apparent as a result of this teaching. For example, the collector body could be mounted on a flexible linkage and thus be vertically movable relative to the tool bit and the workpiece. In such an instance, if the tool bit were a drill, for example, as the collector body and drill are lowered toward the workpiece, the collector body may come into contact therewith and the flexible linkage then would allow the drill bit to move further into the workpiece. This would allow airflow velocity between the workpiece and the lower end of the body to be increased slightly. The increase in airflow rate, and/or any sealing which may occur between the lower end of the collector body and the workpiece, will prevent any dust or turnings from escaping from within the body except to be drawn into the vacuum system. This description, of course, relates only to one such alternate embodiment and many others will now be apparent.

In any event, it is the applicant's intention that this description merely serve to illustrate what is presently considered to be a preferred embodiment of the present invention, which invention is defined only by the following claims, wherefore I claim:

1. Apparatus for collecting dust and chips from an area about a tool comprising
   an arbor upon which the tool is mounted,
   a work platform upon which a workpiece may be mounted for movement relative to the tool,
   means for mounting a collector means in an adjustable fixed relationship relative to the tool, including
   first means for controlling the horizontal position of said apparatus relative to said arbor and
   second means for controlling the vertical position of said apparatus relative to said arbor,
   collector means adjusted to encircle the tool, and
   means for withdrawing air from within said collector means substantially tangentially relative thereto and for generating air turbulence within said collector means such that substantially all dust and chips generated by contact of the tool and the workpiece are collected.

2. The apparatus of claim 1 including
   flexible means extending from said collector means into contacting relationship with the workpiece to restrict the area of airflow between said collector means and the workpiece without inhibiting relative movement between said tool and the workpiece.

3. The apparatus of claim 1 wherein
   said first means comprises
      mounting means operatively connected to said collector means and
      horizontal adjustment means releasably fixed relative to said mounting means, and
   said second means comprises
      adjustment means mounted on said arbor and
      connecting means fixed to said horizontal adjustment means and releasably mounted relative to said adjustment means.

4. Apparatus for collecting the dust and work chips generated by the contact and relative movement of a workpiece and a tool comprising
   a housing having
      an open upper end,
      an open lower end, and
      a tangentially oriented opening intermediate and closely adjacent one of said upper and lower ends,
   means for adjustably mounting said housing about the tool and relative to the workpiece including
      first means for permitting horizontal adjustment of said housing in a first direction to locate the tool therein in an optimum dust and chip collection location, and
      second means adapted to be received on a machine carrying the tool for permitting vertical adjustment of said housing in a second direction to locate the tool relative thereto so that the tool extends beyond said one of said upper and lower ends a distance slightly greater than the depth of work penetration to be accomplished by the tool, and
   vacuum means operatively attached to said tangential opening.

5. The apparatus of claim 4 wherein said housing includes
   at least one air intake opening therein and
   means for restricting the airflow and thereby increasing the velocity thereof past said at least one air intake opening.

6. The apparatus of claim 4 wherein
   said tangentially oriented opening is offset to the side of the tool axis such that centrifugal force exerted on the waste due to rotation of the tool tends to propel the waste into said exhaust opening.

7. The apparatus of claim 4 wherein the tool is a rotating tool, causing the waste to be expelled therefrom in a spiral path and wherein
   said tangentially oriented opening is offset from the tool axis in a direction such that the spiral path extends thereinto.

8. The apparatus of claim 4 wherein
   said tangentially oriented opening is substantially tangentially related to the axis of said housing, which is substantially coaxial with the axis of the tool, on a side thereof determined by the direction of tool rotation so as to capture the maximum quantity of waste therein under the influence of both vacuum and centrifugal forces.

9. Apparatus for collecting and removing waste generated by relative movement between a tool and a workpiece comprising
   a housing having
      an exhaust opening so located relative to the tool and workpiece as to capture waste impelled by centrifugal force,
      at least one intake opening,
   means for supporting said housing relative to the tool and the workpiece comprising
      means for adjustably supporting said housing in a horizontal plane relative to said tool and
      means for adjustably supporting said housing in a vertical plane relative to said tool, and
   flexible means about said at least one intake opening and extending toward the workpiece for controlling the flow of air over the workpiece and into said at least one intake opening and for aiding in creating a partial vacuum in said exhaust opening.

10. Apparatus for collecting dust and chips from an area about a tool comprising an arbor upon which the tool is mounted, a work platform upon which a workpiece may be mounted for movement relative to the tool, means for adjusting a collector means in an horizontally and vertically adjustable fixed relationship relative to the tool, collector means attached to said mounting means to encircle the tool, and means for withdrawing air from within said collector means substantially tangentially relative thereto and for generating air turbulence within said collector means such that substantially all dust and chips generated by contact of the tool and the workpiece are collected.

11. Apparatus for collecting and removing waste generated by relative movement between a tool and a workpiece comprising a housing having an exhaust opening so located relative to the tool and workpiece as to capture waste impelled by centrifugal force, at least one intake opening, means for supporting said housing relative to the tool and the workpiece comprising means for adjustably supporting said housing in a horizontal plane relative to said tool, and flexible means about said at least one intake opening and extending toward the workpiece for controlling the flow of air over the workpiece and into said at least one intake opening and for aiding in creating a partial vacuum in said exhaust opening.

12. The apparatus of claim 11 wherein said housing includes a transparent material through which an operator may view the contact of the workpiece and the tool.

13. The apparatus of claim 4 wherein said housing includes a transparent material through which an operator may view the contact of the workpiece and the tool.

* * * * *